(12) United States Patent
Osaki et al.

(10) Patent No.: US 11,472,289 B2
(45) Date of Patent: Oct. 18, 2022

(54) SPEED CONTROL DEVICE, AUTOMATIC NAVIGATION SYSTEM AND METHOD OF CONTROLLING SPEED

(71) Applicant: FURUNO ELECTRIC CO., LTD., Nishinomiya (JP)

(72) Inventors: Shigeki Osaki, Amagasaki (JP); Hideki Ueno, Takarazuka (JP)

(73) Assignee: FURUNO ELECTRIC COMPANY LIMITED, Nishinomiya (JP)

(*) Notice: Subject to any disclaimer, the term of this patent is extended or adjusted under 35 U.S.C. 154(b) by 0 days.

(21) Appl. No.: 17/138,400

(22) Filed: Dec. 30, 2020

(65) Prior Publication Data

US 2021/0114458 A1 Apr. 22, 2021

Related U.S. Application Data

(63) Continuation of application No. PCT/JP2019/022076, filed on Jun. 4, 2019.

(30) Foreign Application Priority Data

Jul. 2, 2018 (JP) .............................. JP2018-125827

(51) Int. Cl.
*B60K 31/00* (2006.01)
*F02D 41/00* (2006.01)

(52) U.S. Cl.
CPC ...... *B60K 31/0066* (2013.01); *F02D 41/0002* (2013.01)

(58) Field of Classification Search
CPC ............. B60K 31/0066; F02D 41/0002; F02D 41/021; B63H 21/21; G05D 13/62
See application file for complete search history.

(56) References Cited

U.S. PATENT DOCUMENTS

| 4,650,020 A | 3/1987 | Mizuno et al. |
| 2005/0203692 A1* | 9/2005 | Suzuki ............... B60K 31/0066 701/80 |

(Continued)

FOREIGN PATENT DOCUMENTS

| CN | 103293952 A | 9/2013 |
| JP | S5043626 A | 4/1975 |

(Continued)

OTHER PUBLICATIONS

International Search Report issued in PCT/JP2019/022076; dated Aug. 27, 2019.

(Continued)

*Primary Examiner* — Kurt Philip Liethen
(74) *Attorney, Agent, or Firm* — Studebaker & Brackett PC

(57) ABSTRACT

A speed control device which is satisfactory in response and tracking to a speed setting, and can adjust an acceleration-and-deceleration feel according to preferences, is provided. The speed control device 6 controls a speed of a ship so that the speed automatically follows a speed setting set by a ship operator. The speed control device 6 includes a target speed setting module 63 and a change rate adjusting module 64. The target speed setting module 63 sets a target speed that is a target of the speed of the ship to follow, for every unit time, according to the speed setting, to change the target speed based on a given rate of change. The change rate adjusting module 64 decreases the rate of change by adjusting the rate of change at multiple stages, when the target speed set by the target speed setting module 63 approaches the speed setting.

12 Claims, 9 Drawing Sheets

(56) References Cited

U.S. PATENT DOCUMENTS

| | | | | |
|---|---|---|---|---|
| 2005/0256630 | A1* | 11/2005 | Nishira | B60W 40/04 701/41 |
| 2006/0212207 | A1* | 9/2006 | Sugano | B60W 10/184 701/93 |
| 2007/0155258 | A1 | 7/2007 | Kaji | |
| 2008/0078600 | A1* | 4/2008 | Inoue | B60W 30/16 180/170 |
| 2008/0254689 | A1 | 10/2008 | Kaji | |
| 2011/0155100 | A1* | 6/2011 | Matsuda | B60K 28/16 701/99 |
| 2012/0303218 | A1* | 11/2012 | Tamura | B62D 1/046 701/41 |
| 2013/0173145 | A1* | 7/2013 | Yasuda | F02D 41/0002 701/113 |
| 2015/0066335 | A1* | 3/2015 | Kishi | F02D 41/2416 701/103 |
| 2015/0191168 | A1* | 7/2015 | Mitsuyasu | F02D 13/06 701/54 |
| 2016/0046287 | A1* | 2/2016 | Owen | B60W 10/04 701/43 |
| 2016/0108880 | A1* | 4/2016 | Kato | F02D 41/042 701/112 |
| 2017/0137103 | A1 | 5/2017 | Ito | |
| 2018/0057133 | A1 | 3/2018 | Andrasko et al. | |

FOREIGN PATENT DOCUMENTS

| | | | |
|---|---|---|---|
| JP | S611549 | A | 1/1986 |
| JP | S61210244 | A | 9/1986 |
| JP | H03125635 | * | 5/1991 |
| JP | H03125635 | A | 5/1991 |
| JP | H05139185 | A | 6/1993 |
| JP | H07107374 | B2 | 11/1995 |
| JP | 2004034886 | A | 2/2004 |
| JP | 2008110749 | A | 5/2008 |
| JP | 2011173468 | A | 9/2011 |
| JP | 2017088119 | A | 5/2017 |

OTHER PUBLICATIONS

The extended European search report issued by the European Patent Office dated Mar. 18, 2022, which corresponds to European Patent Application No. 19831451.0-1015 and is related to U.S. Appl. No. 17/138,400.

* cited by examiner

SPEED CONTROL DEVICE, AUTOMATIC NAVIGATION SYSTEM AND METHOD OF CONTROLLING SPEED

CROSS-REFERENCE TO RELATED APPLICATION(S)

This application is a continuation of PCT International Application No. PCT/JP2019/022076, which was filed on Jun. 4, 2019, and which claims priority to Japanese Patent Application Ser. No. 2018-125827 filed on Jul. 2, 2018, the entire disclosures of each of which are herein incorporated by reference for all purposes.

TECHNICAL FIELD

The present disclosure mainly relates to a speed control device which performs an automatic tracking control in which a speed of a movable body follows a speed setting set by a user.

BACKGROUND ART

Conventionally, it is known that a ship navigation control system controls an engine speed based on a target ship speed setting and an actual ship speed. Patent Document 1 discloses this kind of ship navigation control system.

The navigation control system of Patent Document 1 corrects a basic engine speed acquired from a map which associates a target ship speed with a basic engine speed, according to a difference between the target ship speed and the actual ship speed, and sets the corrected engine speed as the target engine speed to control the engine so that an actual ship speed approaches the target ship speed.

REFERENCE DOCUMENT OF CONVENTIONAL ART

Patent Document

[Patent Document 1] JP2017-088119A

DESCRIPTION OF THE DISCLOSURE

Problems to be Solved by the Disclosure

However, since Patent Document 1 needs to use the map which associates the target ship speed set in advance with the basic engine speed in order to make the ship speed follow the target ship speed, the computer resources are taken up. Note that since Patent Document 1 uses the map defined in advance, an acceleration and a deceleration are not easily adjustable while making the ship speed follow the target ship speed. Therefore, there is room for an improvement.

The present disclosure is made in view of the above situations, and one purpose thereof is to provide a speed control device which is satisfactory in response and tracking to a speed setting, and can adjust an acceleration-and-deceleration feel according to preferences.

SUMMARY

The problem to be solved by the present disclosure is as described above, and measures to solve the problem and effects thereof are described as follows.

According to the first aspect of the present disclosure, a speed control device with the following configuration is provided. The speed control device controls a speed of a movable body so that the speed automatically follows a speed setting set by a user. The speed control device includes a target speed setting module and a change rate adjusting module. The target speed setting module sets a target speed that is a target of the speed of the movable body to follow, for every unit time, according to the speed setting, to change the target speed based on a given rate of change. The change rate adjusting module decreases the rate of change by adjusting the rate of change at multiple stages, when the target speed set by the target speed setting module approaches the speed setting.

According to this configuration, the multiple-stage change of the speed with a plurality of rates of change can be achieved without requiring a given data, such as a speed-control map. Moreover, the occurrence of an overshoot can be reduced by decreasing the rate of change of the target speed which is the target for the speed of the movable body to follow, when the target speed approaches the speed setting.

The speed control device preferably has the following configuration. That is, the rate of change in the target speed is acquired based on a given speed change parameter, and the speed change parameter includes the unit time and a reference amount of change in the target speed for every unit time.

According to this configuration, by the user setting the speed change parameter, the change rate in the speed of the movable body (i.e., acceleration/deceleration) can be changed easily according to preferences.

In the speed control device, the change rate adjusting module preferably adjusts the rate of change to two different values based on the setting of the reference amount of change.

According to this configuration, the change rate in the target speed can easily be changed at two steps. By changing at two steps, the algorithm for the following to the speed setting can be simpler.

The speed control device preferably has the following configuration. That is, the change rate adjusting module sets a first rate of change, a second rate of change smaller than the first rate of change, and a change speed at which the first rate of change is switched to the second rate of change, based on a given speed change parameter. The change rate adjusting module is adapted to, while the speed setting is above the speed of the movable body, output the first rate of change to the target speed setting module when the target speed set by the target speed setting module is at or below the change speed, and output the second rate of change to the target speed setting module when the target speed is above the change speed. The change rate adjusting module is adapted to, while the speed setting is below the speed of the movable body, output the first rate of change to the target speed setting module when the target speed set by the target speed setting module is at or above the change speed, and output the second rate of change to the target speed setting module when the target speed is below the change speed.

According to this configuration, the range of change of the target speed to which each rate of change is applied can be set. As a result, various acceleration-and-deceleration feels can be achieved.

The speed control device preferably has the following configuration. That is, the speed control device includes a base throttle opening calculating module and a throttle opening outputting module. The base throttle opening calculating module calculates a base throttle opening related to a throttle opening control of an engine provided to the movable body, based on the target speed set by the target speed setting module. The throttle opening outputting module outputs the base throttle opening calculated by the base throttle opening calculating module to a control device of the engine as a throttle opening for control.

According to this configuration, by controlling the throttle opening of the engine, the speed of the movable body can be controlled.

In the speed control device, the throttle opening outputting module preferably outputs a given lower limit of the throttle opening to the control device of the engine as the throttle opening for control when the base throttle opening calculated by the base throttle opening calculating module is below the given lower limit of the throttle opening.

According to this configuration, the control taking a dead zone of a throttle into consideration can be performed, the user can quickly feel the speed change due to the speed setting, and a ride comfort can be improved.

The speed control device preferably has the following configuration. That is, the speed control device includes an actual speed acquiring module, a memory, and a turning speed controlling module. The actual speed acquiring module acquires an actual speed that is a current speed of the movable body. The memory stores the speed setting as a turning start speed. The turning speed controlling module outputs a turning speed setting that is the speed setting during a turning of the movable body. While the movable body is turning, the turning speed controlling module sets the actual speed acquired by the actual speed acquiring module as the speed setting, when a turning angle of the movable body from a start of the tuning is within a given angle range.

According to this configuration, the acceleration/deceleration control during the turning can be stopped, and a natural and stable turning can be secured.

The speed control device preferably has the following configuration. That is, the speed control device includes an actual speed acquiring module and a PID controlling module. The actual speed acquiring module acquires an actual speed that is a current speed of the movable body. The PID controlling module controls the speed of the movable body based on the target speed set by the target speed setting module and the actual speed acquired by the actual speed acquiring module so that the speed follows the target speed.

According to this configuration, a satisfactory response and tracking performance to the target speed can be achieved easily.

According to the second aspect of the present disclosure, an automatic navigation system with the following configuration is provided. That is, the automatic navigation system includes the speed control device and a navigation device. The navigation device displays information related to navigation.

According to this configuration, the automatic navigation system which is satisfactory in response and tracking to the speed setting, and capable of improving the ride comfort, can be provided.

According to the third aspect of the present disclosure, a method of controlling a speed is provided. The method includes the steps of setting target speed that is a target of a speed of a movable body to follow for every unit time, according to a speed setting set by a user in order to make the speed of the movable body follow the target speed by the control to change the target speed based on a given rate of change, and adjusting the rate of change at a multiple stages when the set target speed approaches the speed setting to decrease the rate of change.

According to this configuration, the multiple-stage change of the speed with a plurality of rates of change can be achieved without requiring the given data, such as a speed-control map. Moreover, the occurrence of the overshoot can be reduced by decreasing the rate of change of the target speed which is the target for the speed of the movable body to follow, when the target speed approaches the speed setting.

DETAILED DESCRIPTION

Figure 1:
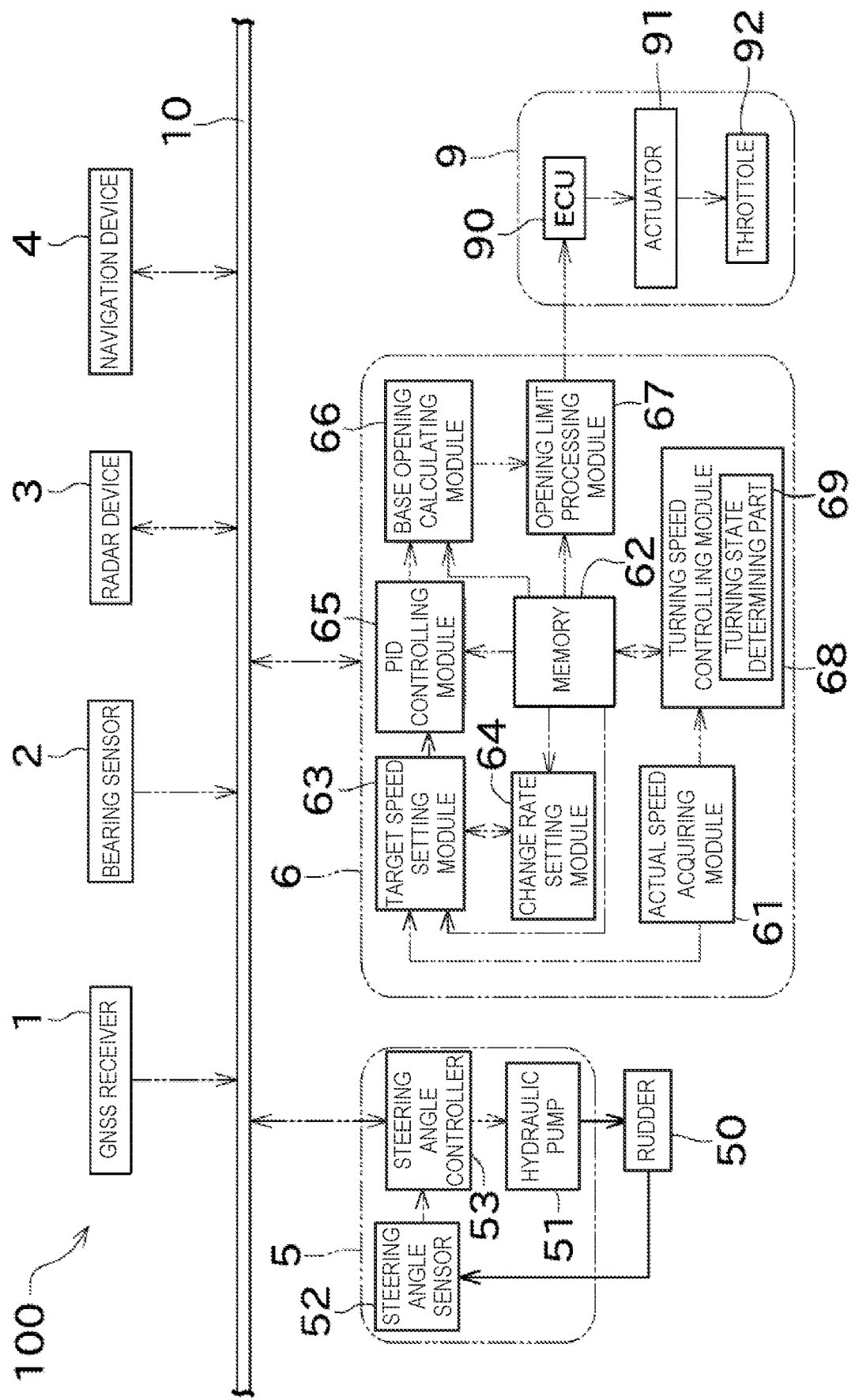
FIG. 1 is a block diagram schematically illustrating a configuration of an automatic navigation system according to one embodiment of the present disclosure.

Next, one embodiment of the present disclosure is described with reference to the drawings. FIG. 1 is a block diagram schematically illustrating a configuration of an automatic navigation system 100 according to this embodiment of the present disclosure.

The automatic navigation system 100 of this embodiment may be mounted on an unillustrated ship (movable body), and cause the ship to travel automatically according to a given navigation route/course. As illustrated in FIG. 1, the automatic navigation system 100 may include a GNSS receiver 1, a bearing sensor 2, a radar device 3, a navigation device 4, an autopilot device 5, and an automatic speed controlling device (speed control device) 6. These devices may be connected with each other, for example, through a CAN bus 10 so that two-way communications are possible. CAN may be an abbreviation of "Controller Area Network."

The GNSS receiver 1 may receive positioning signals from a plurality of satellites by using GNSS antennas (not-illustrated), and detect information, such as the position of the ship and a traveling speed, based on the received positioning signals. The GNSS receiver 1 may output the detected information to the navigation device 4 and the autopilot device 5. The GNSS may include satellite positioning systems established in some countries and areas, such as GPS, GLONASS, Galileo, BeiDou, QZSS, and Gagan.

The bearing sensor 2 may be constructed as a satellite compass provided with a plurality of GNSS antennas fixed to the ship, and measure a heading of the ship based on relative relations of the ship position detected by the GNSS antennas. The bearing sensor 2 may output the measured heading to the navigation device 4, the autopilot device 5, and the automatic speed controlling device 6. Note that the bearing sensor 2 is not limited to the above configuration, and, for example, it may be comprised of a magnetic direction sensor, a gyrocompass, etc.

The radar device 3 may generate a radar image indicative of a situation and position of a target object around the ship by transmitting and receiving an electric wave through a radar antenna (not-illustrated). The radar device 3 may output the generated radar image to the navigation device 4.

The navigation device 4 may be installed in an operation room (e.g., a steering station) provided to the ship. A ship operator (user) can instruct information, such as a destination and a speed (a speed setting $V_S$), related to the navigation of the ship by operating the navigation device 4. The navigation device 4 may generate the navigation route/course based on the information set by the ship operator. The navigation device 4 can display the ship position, the navigation route/course setting, and a trace of the ship in such a form that they are superimposed on an electronic nautical chart.

The autopilot device 5 may be comprised of a steering angle sensor 52 which detects a steering angle of a rudder 50 of the ship, a hydraulic pump 51 which drives the rudder 50, and a steering angle controller 53 which controls operation of the hydraulic pump 51. The autopilot device 5 can control the operation of the hydraulic pump 51 based on the information on the ship position and the heading inputted from the GNSS receiver 1 and the bearing sensor 2 to operate the rudder automatically so that the ship travels according to the navigation route/course set by the navigation device 4.

The automatic speed controlling device 6 may control the traveling speed automatically so that the traveling speed of the ship follows the speed setting which is set by the ship operator. The automatic speed controlling device 6 may output an instruction for a throttle opening related to an intake air amount of an engine 9 which is a power source of the ship to an ECU (Engine Control Unit) 90 which is a control device for the engine 9 to control the output of the engine 9, thereby controlling the traveling speed of the ship. The automatic speed controlling device 6 shall also be referred to as "processing circuitry".

Meanwhile, for example, the ECU 90 adjusts the opening of a throttle 92 by controlling an actuator 91 which drives the throttle 92 for adjusting the intake air amount of the engine 9.

The automatic speed controlling device 6 may include an actual speed acquiring module 61, a memory 62, a target speed setting module 63, a change rate setting module (change rate adjusting module) 64, and a PID controlling module 65, a base opening calculating module (base throttle opening calculating module) 66, an opening limit processing module (throttle opening outputting module) 67, and a turning speed controlling module 68. The automatic speed controlling device 6 may make the traveling speed of the ship follow the speed setting $V_S$ which is set by the ship operator, by using an algorithm illustrated in FIG. 2.

Describing with reference to FIG. 2, the automatic speed controlling device 6 may set a target speed $V_T$ for the speed setting $V_S$ set by the ship operator so as to track or follow the speed setting $V_S$ by using a speed rate processing (described later), and output it to the PID controlling module 65. The automatic speed controlling device 6 may perform a PID control for the traveling speed so that the traveling speed of the ship follows the set target speed $V_T$ by using the PID controlling module 65.

Thus, regardless of a speed difference $\Delta V$ between the speed setting $V_S$ and the actual speed V which is the current traveling speed of the ship, the target speed $V_T$ can be changed gradually, and the traveling speed of the ship can automatically follow the target speed $V_T$ suitably. That is, when the speed difference $\Delta V$ between the speed setting $V_S$ and the actual speed V is large, the automatic speed controlling device 6 of this embodiment can avoid a sudden acceleration/deceleration of the ship in case of the traveling speed simply following the speed setting $V_S$, thereby achieving a satisfactory response and tracking performance.

The automatic speed controlling device 6 may be provided with a known computer (not illustrated). The computer may include a CPU, a ROM, a RAM, and an I/O part, which are not illustrated. The ROM may store various programs, data, etc. The CPU can read and execute the various programs etc. from the ROM. The automatic speed controlling device 6 can operate the computer as the memory 62, the target speed setting module 63, the change rate setting module 64, the PID controlling module 65, the base opening calculating module 66, the opening limit processing module 67, and the turning speed controlling module 68, by collaboration of hardware and software.

The actual speed acquiring module 61 may detect an actual speed V of the ship. Note that the actual speed may be a ground speed on the basis of the earth. The actual speed acquiring module 61 may acquire the actual speed (ground speed) of the ship, for example, by calculating a change in the position obtained by the GNSS receiver 1.

The memory 62 may store various data related to a control of the traveling speed of the ship. The data may include parameters for the control, such as given parameters for calculation and speed change parameters set by the ship operator.

The target speed setting module 63 may set a target speed $V_T$ for every unit time $T_0$ so that the traveling speed of the ship changes gradually until it reaches the speed setting $V_S$ set by the ship operator, for example, through the navigation device 4. That is, the target speed setting module 63 may change the target speed $V_T$ based on a given rate of change, by setting the target speed $V_T$ for every unit time $T_0$. In other words, the target speed setting module 63 may change the target speed $V_T$ to be set, by a unit change amount $\Delta v_U$, during each given unit time $T_0$, regardless of the speed difference $\Delta V$ between the speed setting $V_S$ and the actual speed V of the ship.

Figure 3:
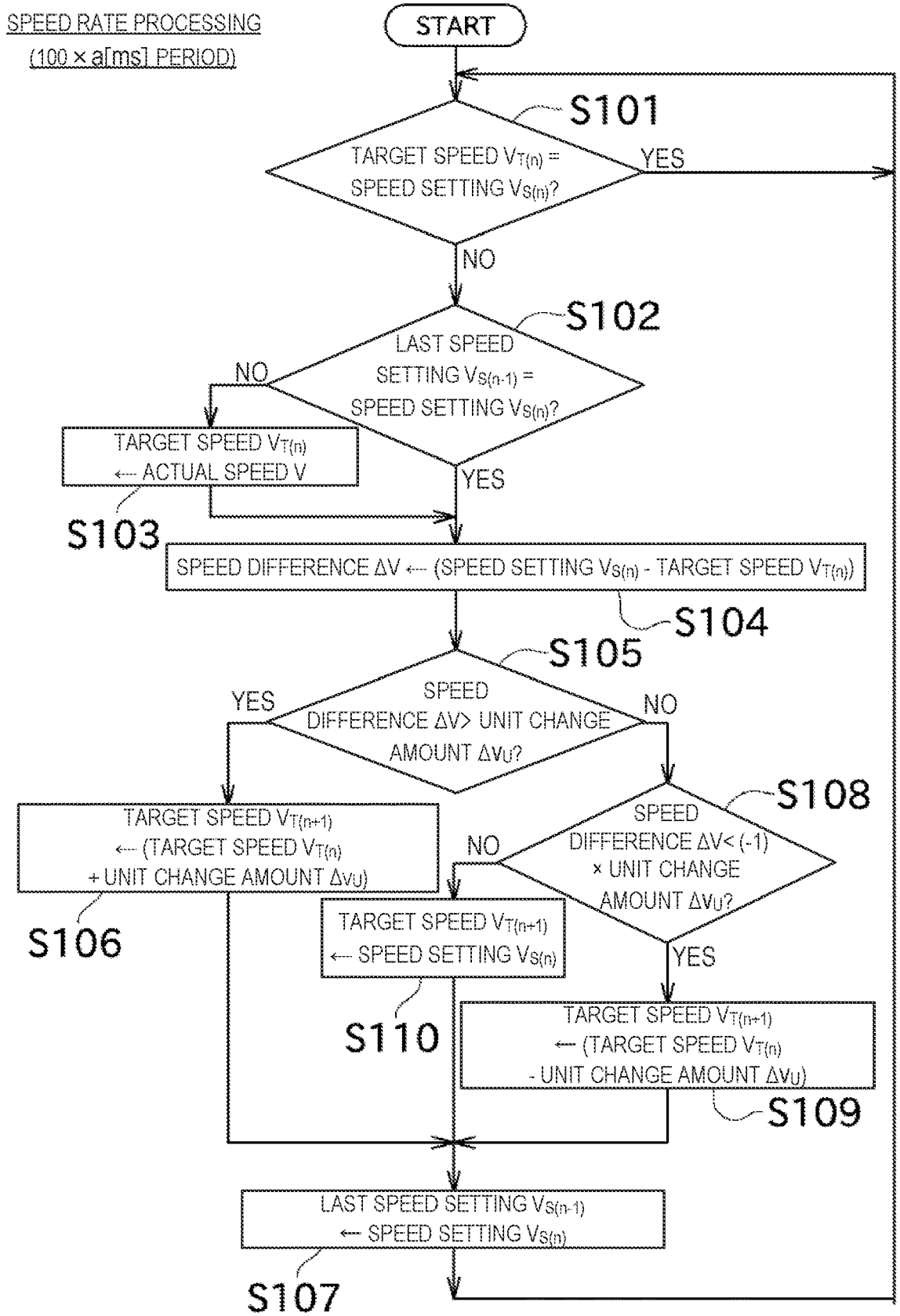
FIG. 3 is a flowchart related to a speed rate processing.

In detail, the target speed setting module 63 may perform the speed rate processing illustrated in FIG. 3 for the purpose of avoiding that the traveling speed of the ship changes rapidly in a short period of time. Although in the speed rate processing of FIG. 3 processings at Steps S101-S109 may be repeated as a loop fashion, one loop is performed for every given unit time $T_0$.

In the following description, in order to distinguish the last speed setting $V_S$ and the current speed setting $V_S$, the speed setting $V_S$ inputted in the current loop may be given a subscript "(n)" and referred to as the "speed setting $V_{S(n)}$," and the speed setting $V_S$ inputted in the last loop may be given a subscript "(n−1)" and referred to as the "last speed setting $V_{S(n-1)}$." Note that "n" may be an integer which is incremented by one for each loop.

When the speed rate processing illustrated in FIG. 3 is started, the target speed setting module 63 may determine whether a current target speed $V_{T(n)}$ of the ship is equal to the currently-inputted speed setting $V_{S(n)}$ (Step S101). If the current target speed $V_{T(n)}$ is equal to the speed setting $V_{S(n)}$, since the target speed $V_{T(n)}$ does not need to be changed, the target speed setting module 63 may return to Step S101. As the result of the determination at Step S101, if the current target speed $V_{T(n)}$ is not equal to the speed setting $V_{S(n)}$, the target speed setting module 63 may transit to Step S102.

At Step S102, the target speed setting module 63 may determine whether the last speed setting $V_{S(n-1)}$ is equal to the speed setting $V_{S(n)}$. If the last speed setting $V_{S(n-1)}$ is not equal to the speed setting $V_{S(n)}$, the target speed setting module 63 may set the actual speed V of the ship as a reference speed for defining the current target speed $V_{T(n)}$ of the ship (Step S103). As the result of the determination at Step S102, if the last speed setting $V_{S(n-1)}$ is equal to the speed setting $V_{S(n)}$, the target speed setting module 63 may skip the processing at Step S103.

Then, the target speed setting module 63 may calculate a speed difference ΔV between the speed setting $V_{S(n)}$ and the target speed $V_{T(n)}$ (Step S104). If the speed setting $V_{S(n)}$ is above the target speed $V_{T(n)}$, the speed difference ΔV may become a positive value, and if the speed setting $V_{S(n)}$ is below the target speed $V_{T(n)}$, the speed difference ΔV may become a negative value.

After the processing at Step S104 is performed, the target speed setting module 63 may compare the calculated speed difference ΔV with the unit change amount $\Delta v_U$ outputted from the change rate setting module 64 described later (Step S105). This unit change amount $\Delta v_U$ may always become a positive value.

As the result of the comparison at Step S105, if the speed difference ΔV is above the unit change amount $\Delta v_U$, this may mean that the speed setting is largely deviated to the positive side (accelerating side) from the target speed. Therefore, in this case, the target speed setting module 63 may set a value obtained by adding the unit change amount $\Delta v_U$ to the current target speed $V_{T(n)}$ as a target speed $V_{T(n+1)}$ for the next loop (Step S106).

Then, in order to determine the change in the speed setting $V_S$ at Step S102, the target speed setting module 63 may set the current speed setting $V_{S(n)}$ as the last speed setting $V_{S(n-1)}$ (Step S107), and then return to Step S101.

As the result of the comparison at Step S105, if the speed difference ΔV is at or below the unit change amount $\Delta v_U$, the target speed setting module 63 may compare the speed difference ΔV with a value obtained by multiplying the unit change amount $\Delta v_U$ by −1 (Step S108). As the result of the comparison, when the speed difference ΔV is below [the unit change amount $\Delta v_U \times -1$], this may mean that the speed setting is deviated largely to the negative side (decelerating side) from the target speed. Therefore, in this case, the target speed setting module 63 may set a value obtained by subtracting the unit change amount $\Delta v_U$ from the current target speed $V_{T(n)}$ of the ship as a target speed $V_{T(n+1)}$ for the next loop (Step S109), and then transit to Step S107.

On the other hand, as the result of the comparison, if the speed difference ΔV is at or above [the unit change amount $\Delta v_U \times -1$], this may mean that the deviation of the speed setting from the target speed is small. Therefore, the target speed setting module 63 may set the speed setting $V_{S(n)}$ as a target speed $V_{T(n+1)}$ for the next loop (Step S110), and then transit to Step S107.

By the target speed setting module 63 performing such a speed rate processing, the target speed $V_T$ which is a target traveling speed to follow may be updated so that it increases/decreases gradually for every unit time. Therefore, the traveling speed of the ship may change gradually, and the sudden acceleration/deceleration in a short period of time can be avoided.

Meanwhile, a coefficient "a" related to the unit time $T_0$ which is used in the speed rate processing by the target speed setting module 63, and a reference unit change amount $\Delta v_S$ related to the unit change amount $\Delta v_U$ may be set, for example, by operation of the ship operator. The coefficient "a" may be an integer.

Figure 4A:
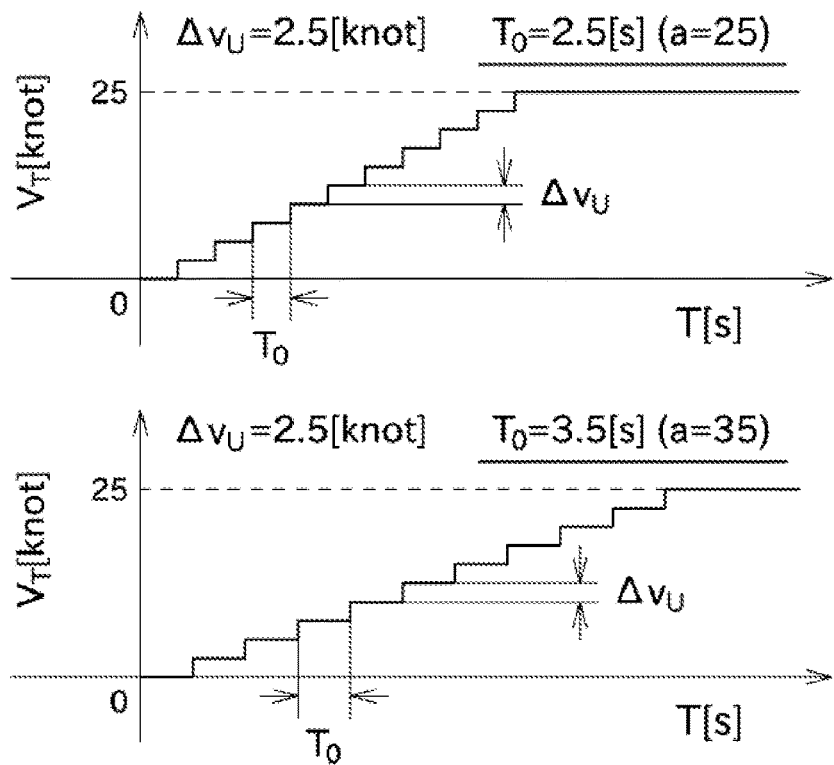
FIG. 4A illustrates graphs of a change in a target speed $V_T$ in different unit times $T_0$.

In detail, the coefficient "a" for the speed rate processing period illustrated in FIG. 3 can be set by the ship operator through the navigation device 4 etc. In this case, the unit time $T_0$ which is an update period of the target speed becomes, for example, a value obtained by multiplying the coefficient "a" by a given time (in the embodiment, it is, but no limited to, 100 ms). As illustrated in FIG. 4A, although the target speed $V_T$ changes in a stepped manner, but, by setting a large coefficient, the processing period (unit time $T_0$) of the target speed setting module 63 may increase, and therefore, the change in the target speed $V_T$ may become mild.

Figure 4B:
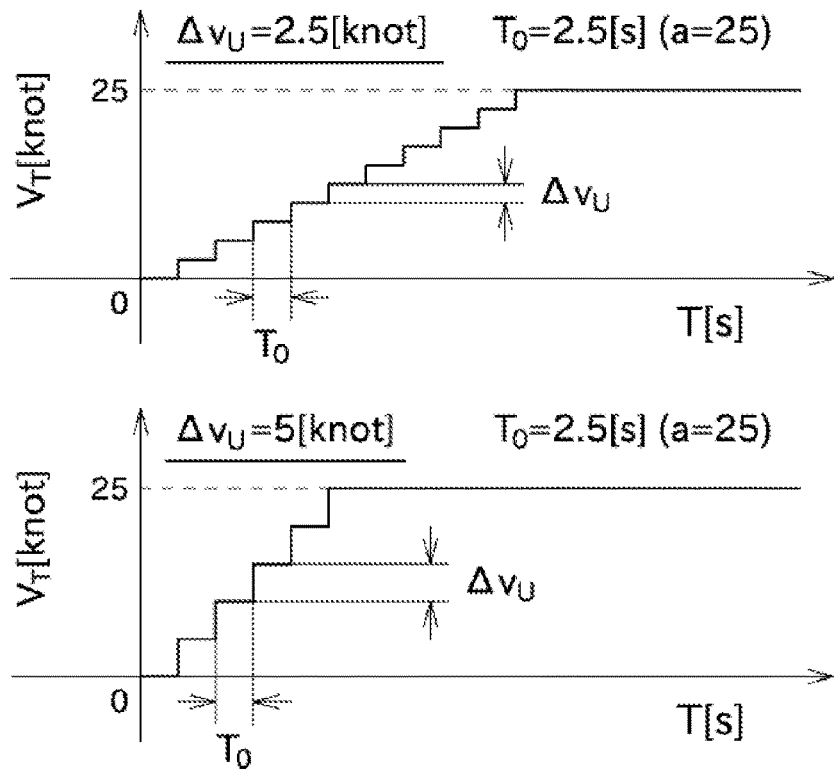
FIG. 4B illustrates graphs of a change in the target speed $V_T$ in different unit change amounts $\Delta v_U$.

Moreover, the ship operator can operate the navigation device 4 etc. to set the reference unit change amount $\Delta v_S$ (reference amount of change). The reference unit change amount $\Delta v_S$ may be adjusted by the change rate setting module 64 (described later) and may be outputted to the target speed setting module 63 as the unit change amount $\Delta v_U$. That is, by the ship operator setting the reference unit change amount $\Delta v_S$ to increase the unit change amount $\Delta v_U$, the target speed $V_T$ can be changed relatively rapidly as illustrated in FIG. 4B.

In this way, for example, by the ship operator setting the speed change parameters, such as the coefficient "a" related to the unit time $T_0$ and the reference unit change amount $\Delta v_S$ related to the unit change amount $\Delta v_U$, the rate of change in the target speed $V_T$ (i.e., the traveling speed of the ship) to the speed setting $V_S$ can be adjusted according to preferences, and therefore, the favorite acceleration-and-deceleration feel can be selected.

Note that, it is not necessary to set the speed change parameters at every speed setting, and when they are once set, the set speed change parameters may be stored in the memory 62. The subsequent settings of the target speed $V_T$ will be performed using the speed change parameters stored in the memory 62. The speed change parameters stored in the memory 62 can be updated by a resetting operation.

When a given condition is satisfied, the change rate setting module 64 may adjust the rate of change (unit change amount $\Delta v_U$) in the target speed $V_T$ by using the reference unit change amount $\Delta v_S$ of the target speed $V_T$ set by the ship operator. The given condition may be that the target speed $V_T$ set by the target speed setting module 63 is above a switching speed $V_B$ calculated using a set coefficient b (here, 0<b<1). Note that the switching speed $V_B$ may be a speed indicative of a reference for switching the unit change amount $\Delta v_U$ so as to be adjusted smaller.

Figure 5:
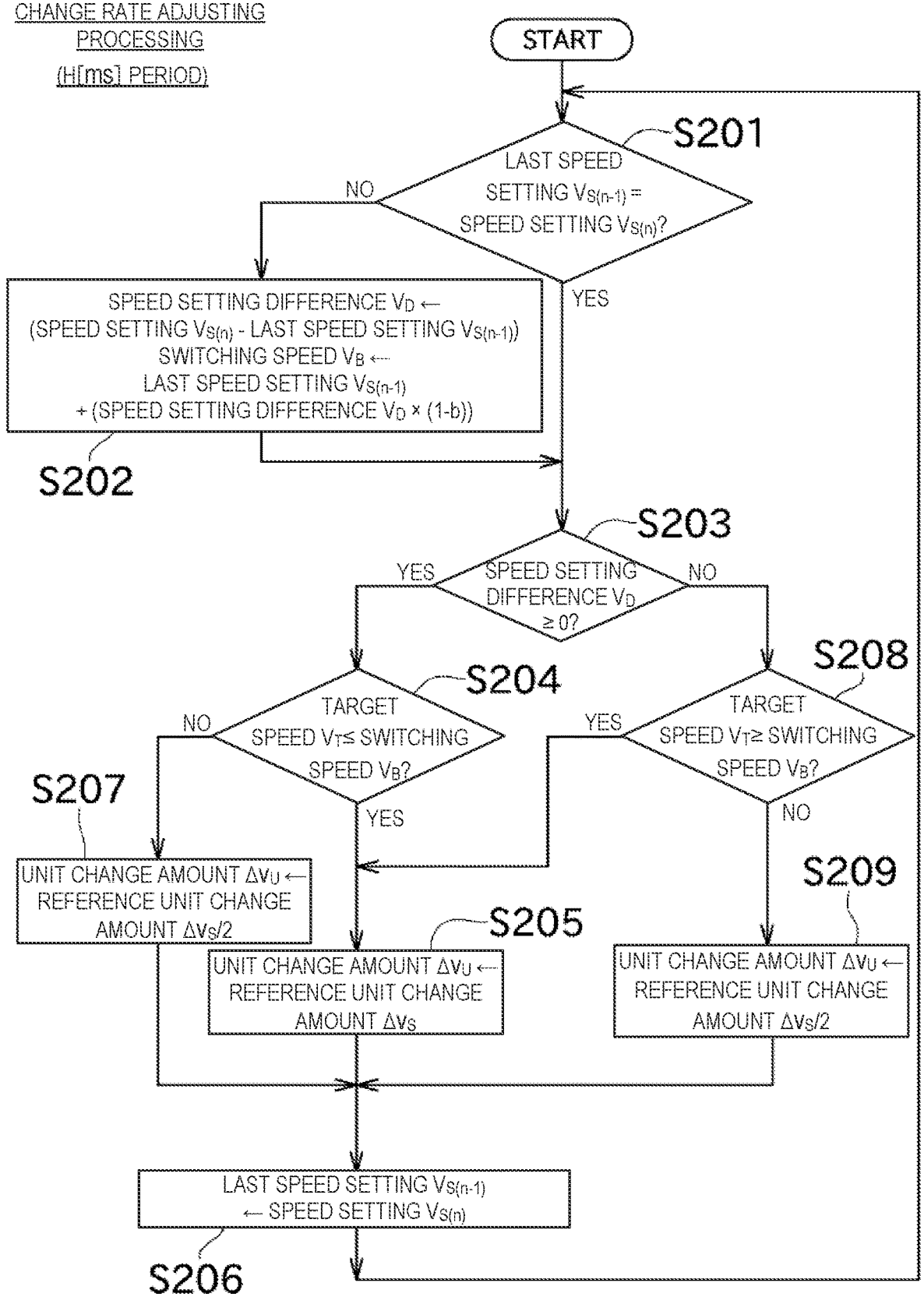
FIG. 5 is a flowchart about a change rate adjusting processing.

Describing concretely, the change rate setting module 64 may perform a change rate adjusting processing illustrated in FIG. 5. The change rate adjusting processing may be performed independently from the speed rate processing of FIG. 3 and performed simultaneously parallel with the speed rate processing. Moreover, although in the change rate adjusting processing of FIG. 5 the processings at Steps S201-S209 are repeated as a loop fashion, one loop may be performed at a period Hms same as the unit time $T_0$ described in the speed rate processing (i.e., H is a value obtained by multiplying the coefficient "a" by 100). However, the change rate adjusting processing is not limited to this configuration, but may be performed at a period sufficiently shorter than the unit time $T_0$, for example.

When the change rate adjusting processing illustrated in FIG. 5 is started, the change rate setting module 64 may determine whether the last speed setting $V_{S(n-1)}$ inputted in the last loop is equal to the currently-inputted speed setting $V_{S(n)}$ (Step S201).

As the result of the determination at Step S201, if the last speed setting $V_{S(n-1)}$ is not equal to the speed setting $V_{S(n)}$ (for example, when the ship operator sets a new speed), the change rate setting module 64 may calculate a speed setting difference $V_D$ which is the difference between the speed setting $V_{S(n)}$ and the last speed setting $V_{S(n-1)}$, and calculate the switching speed $V_B$, as a value obtained by multiplying the speed setting difference $V_D$ by a value obtained by subtracting the coefficient b from 1 and adding it to the last speed setting $V_{S(n-1)}$ (Step S202). If the speed setting $V_{S(n)}$ is above the last speed setting $V_{S(n-1)}$, the speed setting difference $V_D$ may become a positive value, and if the speed setting $V_{S(n)}$ is below the last speed setting $V_{S(n-1)}$, the speed setting difference $V_D$ may become a negative value. As the result of the determination at Step S201, if the last speed setting $V_{S(n-1)}$ is equal to the speed setting $V_{S(n)}$, the change rate setting module 64 may skip the processing at Step S202.

Then, the change rate setting module 64 may compare the calculated speed setting difference $V_D$ with 0 (Step S203).

As the result of the comparison at Step S203, if the speed setting difference $V_D$ is zero or more (i.e., if accelerating), the change rate setting module 64 may compare the target speed $V_T$ set by the target speed setting module 63 with the switching speed $V_B$ (Step S204).

As the result of the comparison at Step S204, if the target speed $V_T$ is at or below the switching speed $V_B$, the change rate setting module 64 may output the reference unit change amount $\Delta v_S$ set by the ship operator as it is, as the unit change amount $\Delta v_U$ to be used by the target speed setting module 63 ($\Delta v_U = \Delta v_S$, Step S205). Then, in order to determine the change in the speed setting $V_S$ at Step S201, the change rate setting module 64 may set the speed setting $V_{S(n)}$ as the last speed setting $V_{S(n-1)}$ (Step S206), and then return to Step S201.

On the other hand, as the result of the comparison at Step S204, if the target speed $V_T$ is above the switching speed $V_B$, the change rate setting module 64 may output a value obtained by dividing the reference unit change amount $\Delta v_S$ set by the ship operator by two, as the unit change amount $\Delta v_U$ to be used by the target speed setting module 63 ($\Delta v_U = \Delta v_S/2$, Step S207). Then, the change rate setting module 64 may transit the processing to Step S206.

As the result of the comparison at Step S203, if the speed setting difference $V_D$ is below zero (i.e., if slowing down), the change rate setting module 64 may compare the target speed $V_T$ set by the target speed setting module 63 with the switching speed $V_B$ (Step S208).

As the result of the comparison at Step S208, if the target speed $V_T$ is at or above the switching speed $V_B$, the change rate setting module 64 may transit to Step S205. If the target speed $V_T$ is below the switching speed $V_B$, the change rate setting module 64 may output a value obtained by dividing the reference unit change amount $\Delta v_S$ set by the ship operator by two, as the unit change amount $\Delta v_U$ to be used by the target speed setting module 63 ($\Delta v_U = \Delta v_S/2$, Step S209). Then, the change rate setting module 64 may transit the processing to Step S206.

Figure 6:
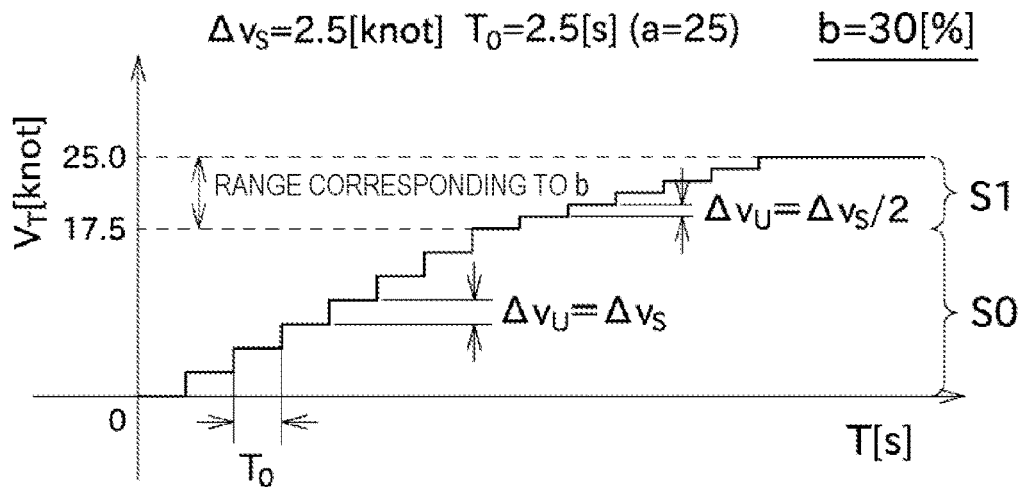
FIG. 6 illustrates graphs of a change in the target speed $V_T$ in different coefficients b.
Figure 6:
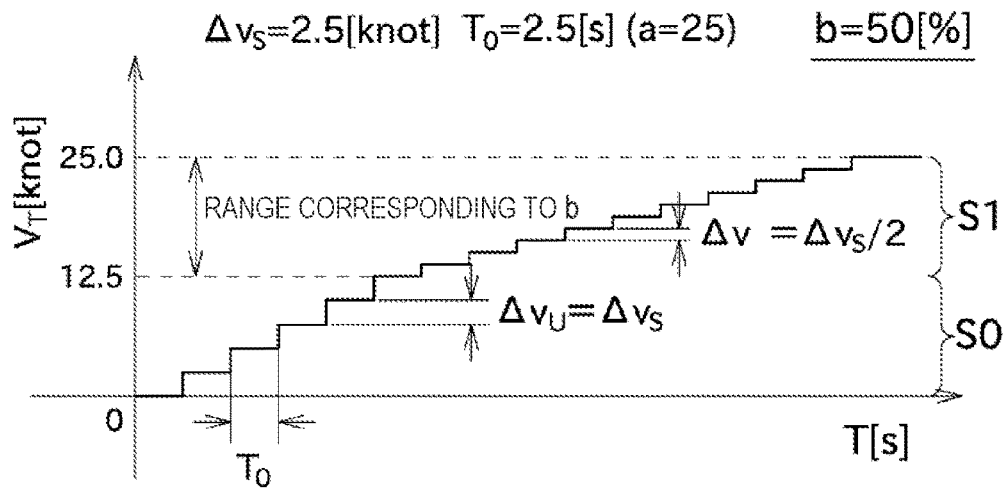

As illustrated in FIG. 6, by the change rate setting module 64 performing such a change rate adjusting processing, the target speed setting module 63 may set the target speed $V_T$ by using each of the two different unit change amounts ($\Delta v_S$ and $\Delta v_S/2$) outputted from the change rate setting module 64, in the different phases.

That is, as illustrated in FIG. 6, the target speed $V_T$ set by the target speed setting module 63 may change according to one of a first rate of change based on the unit change amount $\Delta v_U = \Delta v_S$ outputted from the change rate setting module 64, and a second rate of change based on the unit change amount $\Delta v_U = \Delta v_S/2$.

In other words, in a first phase of a period during which the target speed $V_T$ changes, the target speed setting module 63 may update the target speed $V_T$ by using the comparatively large unit change amount $\Delta v_U = \Delta v_S$. On the other hand, in a phase where the target speed $V_T$ approached the speed setting $V_S$ to some extent, the target speed setting module 63 may update the target speed $V_T$ by using the comparatively small unit change amount $\Delta v_U = \Delta v_S/2$.

Therefore, at the initial phase of the period where the target speed $V_T$ changes, the tracking performance (i.e., the response) to the speed setting $V_S$ can be improved by changing the target speed $V_T$ each time by a comparatively large unit change amount $\Delta v_U = \Delta v_S$. On the other hand, after the target speed $V_T$ approached the speed setting $V_S$ to some extent ($\Delta v_U = \Delta v_S/2$), an overshoot can be reduced by decreasing the unit amount of change of the target speed $V_T$. Moreover, since the rate of change in the target speed $V_T$ is simply changed at two steps, the algorithm can be simpler.

Meanwhile, the coefficient b for calculating the switching speed $V_B$ in the change rate adjusting processing can be set arbitrarily according to the ship operator's preferences through the navigation device 4 etc. The coefficient b set by the ship operator may be stored in the memory 62. The change rate setting module 64 may calculate the switching speed $V_B$ using the coefficient b stored in the memory 62. Note that, by the ship operator resetting the coefficient b, the coefficient b stored in the memory 62 can be updated.

As illustrated in two graphs of FIG. 6, each of ranges of change S0 and S1 of the target speed $V_T$ based on each unit change amount $\Delta v_U$ may be adjusted according to the value of the coefficient b. In detail, by increasing the coefficient b, the range S0 of the target speed $V_T$ to which the comparatively large unit change amount $\Delta v_U = \Delta v_S$ is applied may become smaller, and, on the other hand, the range S1 of the target speed $V_T$ to which the comparatively small unit change amount $\Delta v_U = \Delta v_S/2$ is applied may become larger.

That is, by increasing the coefficient b, the change in the target speed $V_T$ can be milder as a whole. Thus, also by adjusting the coefficient b, different acceleration/deceleration feels can be adjusted.

Figure 2:
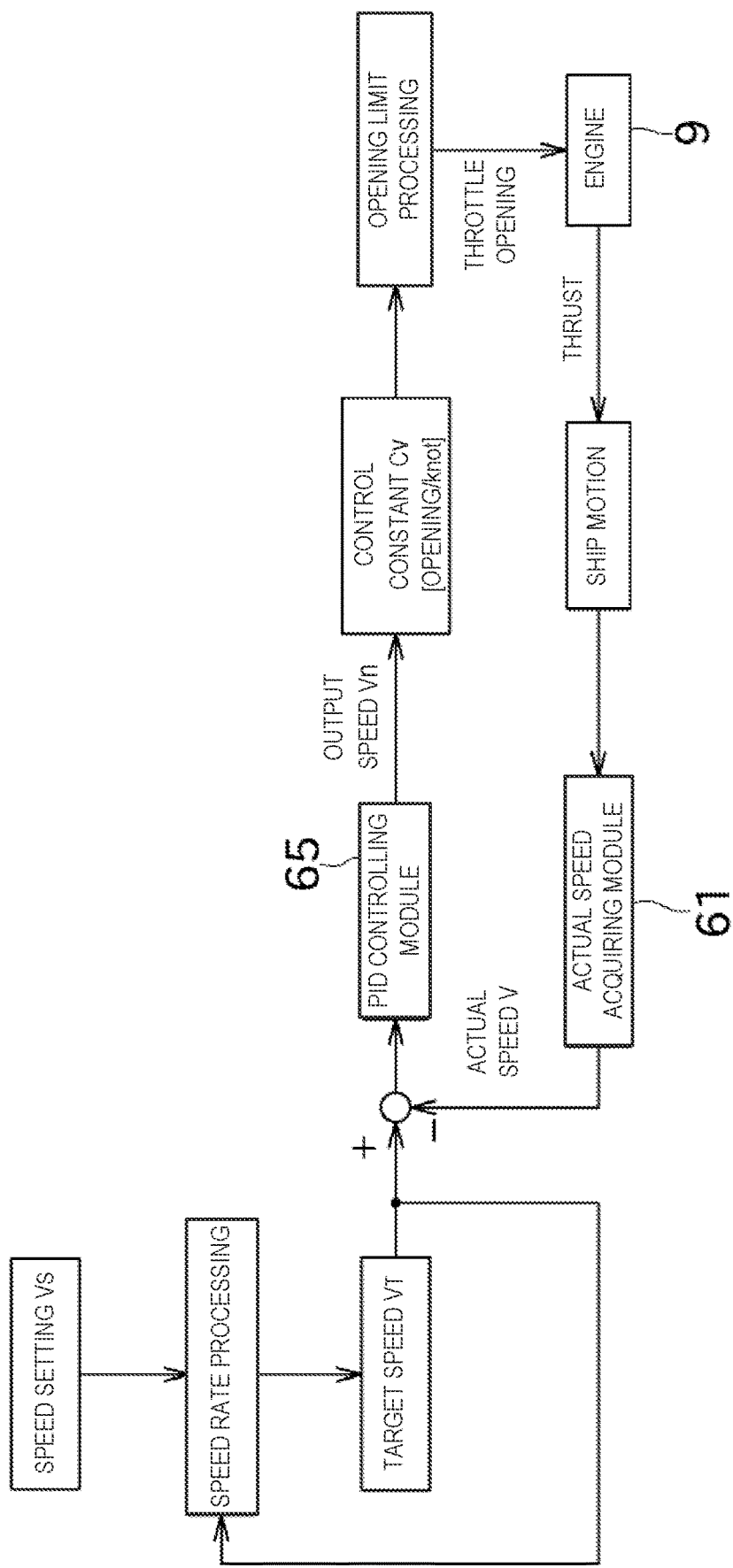
FIG. 2 is a block diagram schematically illustrating a speed-control algorithm in an automatic speed controlling device.
Figure 7:
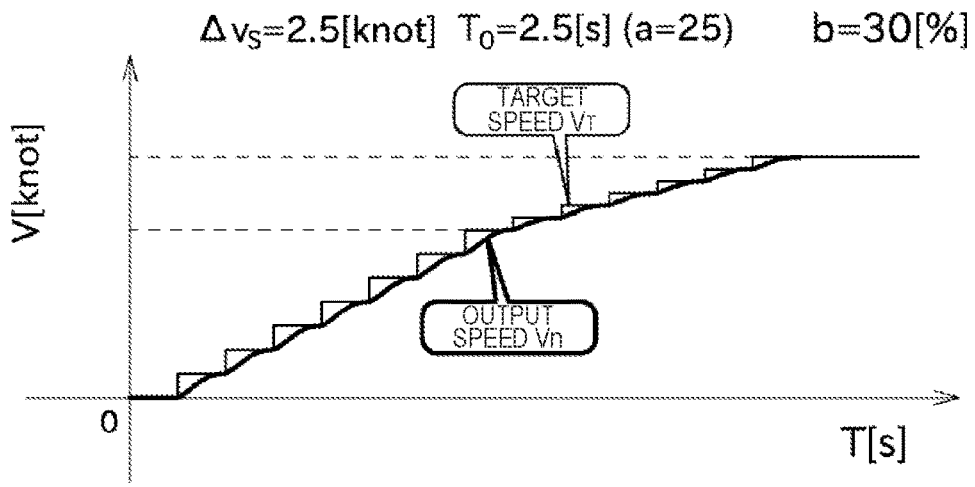
FIG. 7 illustrates a graph of an output speed for making the actual speed follow the target speed.

As illustrated in FIGS. 2 and 7, the PID controlling module 65 of FIG. 1 may input a deviation of the actual speed V of the ship from the target speed $V_T$ and calculate an output speed $V_n$ which is a parameter, according to a known formula, so that the traveling speed of the ship follows the target speed $V_T$ set by the target speed setting module 63.

The base opening calculating module 66 may convert the output speed $V_n$ calculated by the PID controlling module 65 into a base throttle opening $U_{n0}$ which is a controlled variable related to a throttle opening control. In detail, the base opening calculating module 66 may calculate the base throttle opening $U_{n0}$ corresponding to the output speed $V_n$ by multiplying the output speed $V_n$ by a given constant Cv.

The opening limit processing module 67 may perform a limiting processing to the base throttle opening $U_{n0}$ calculated by the base opening calculating module 66, by using a given maximum throttle opening $U_{max}$ and a given minimum throttle opening (throttle opening lower limit) $U_{min}$.

In detail, if the base throttle opening $U_{n0}$ calculated by the base opening calculating module 66 is below the minimum throttle opening, the opening limit processing module 67 may output the minimum throttle opening $U_{min}$ to the ECU 90 of the engine 9 as the throttle opening $U_n$ for control.

If the base throttle opening $U_{n0}$ calculated by the base opening calculating module 66 is at or above the minimum throttle opening $U_{min}$ and is at or below the maximum throttle opening $U_{max}$, the opening limit processing module 67 may output the base throttle opening $U_{n0}$ calculated by the base opening calculating module 66 to the ECU 90 of the engine 9 as the throttle opening $U_n$ for control.

If the base throttle opening $U_{n0}$ calculated by the base opening calculating module 66 is above the maximum throttle opening $U_{max}$, the opening limit processing module 67 may output the maximum throttle opening $U_{max}$ to the ECU 90 of the engine 9 as the throttle opening $U_n$ for control.

The ECU 90 of the engine 9 may operate the actuator 91 according to the throttle opening $U_n$ for control outputted by performing the limiting processing by the opening limit processing module 67 to change the opening of the throttle 92.

Thus, by adjusting the opening of the throttle 92, the intake air amount of the engine 9 may change and the output of the engine 9 may be adjusted. That is, the actual speed of the ship may be adjusted.

Figure 8:
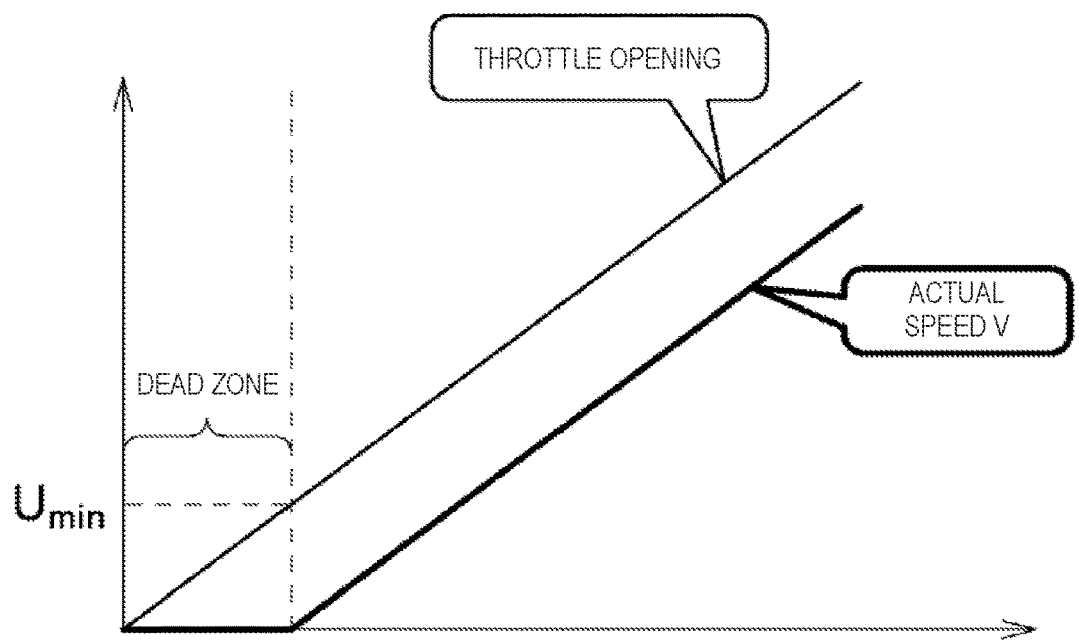
FIG. 8 is a conceptual view illustrating a relation between a throttle opening and the actual speed.

Meanwhile, the maximum throttle opening $U_{max}$ can be, for example, the maximum throttle opening which can be given according to the specification of the ECU 90 of the engine 9. The minimum throttle opening $U_{min}$ may be set to a value, for example, obtained by taking a dead zone illustrated in FIG. 8 into consideration. That is, the minimum throttle opening $U_{min}$ may be a throttle opening at which the actual speed V of the ship begins to change according to the change in the throttle opening. Note that the dead zone may be a zone of the actual speed V where the actual speed V does not change according to the change in an opening command value of the throttle 92, and, for example, it may be caused by mechanical plays.

As described above, by the base opening calculating module 66 performing the limiting processing to the base throttle opening $U_{n0}$, since the dead zone of the actual speed V when the throttle opening is below the given value can be covered, and the ship operator can quickly feel the change in the actual speed V, a brisk ride comfort can be realized.

Figure 9:
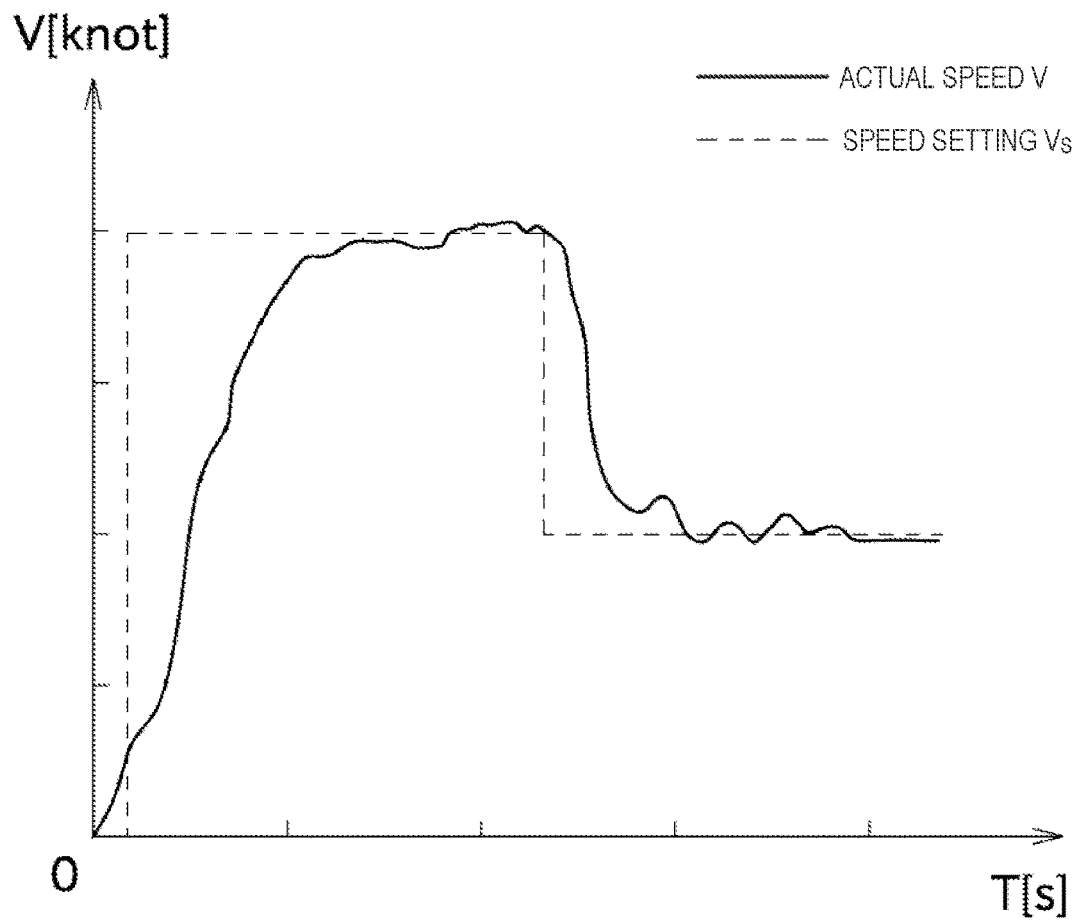
FIG. 9 is a graph illustrating one example of experimental data using the automatic speed controlling device.

As described above, the automatic speed controlling device 6 of this embodiment may give the gradually-increasing target speed $V_T$ to the PID controlling module 65 according to the speed setting $V_S$ set by the ship operator. FIG. 9 illustrates a result of an experiment in which the automatic speed controlling device 6 is applied to an actual ship. As illustrated in FIG. 9, the ship provided with the automatic speed controlling device 6 of this embodiment can achieve both a satisfactory response to the change in the speed setting $V_S$ and a prevention of an excessively sudden acceleration/deceleration in a well-balanced fashion.

The turning speed controlling module 68 may be used for controlling a speed when the ship turns, and may be provided with a turning state determining part 69. The turning state determining part 69 may determine whether the ship is turning, for example, based on whether a change in the bow direction (heading) detected by the bearing sensor 2 is above a given threshold. Note that the change in the heading can be obtained, for example, by a differentiation of the heading angle, or a calculation of a difference between the current heading angle and a heading angle before a given time.

Figure 10:
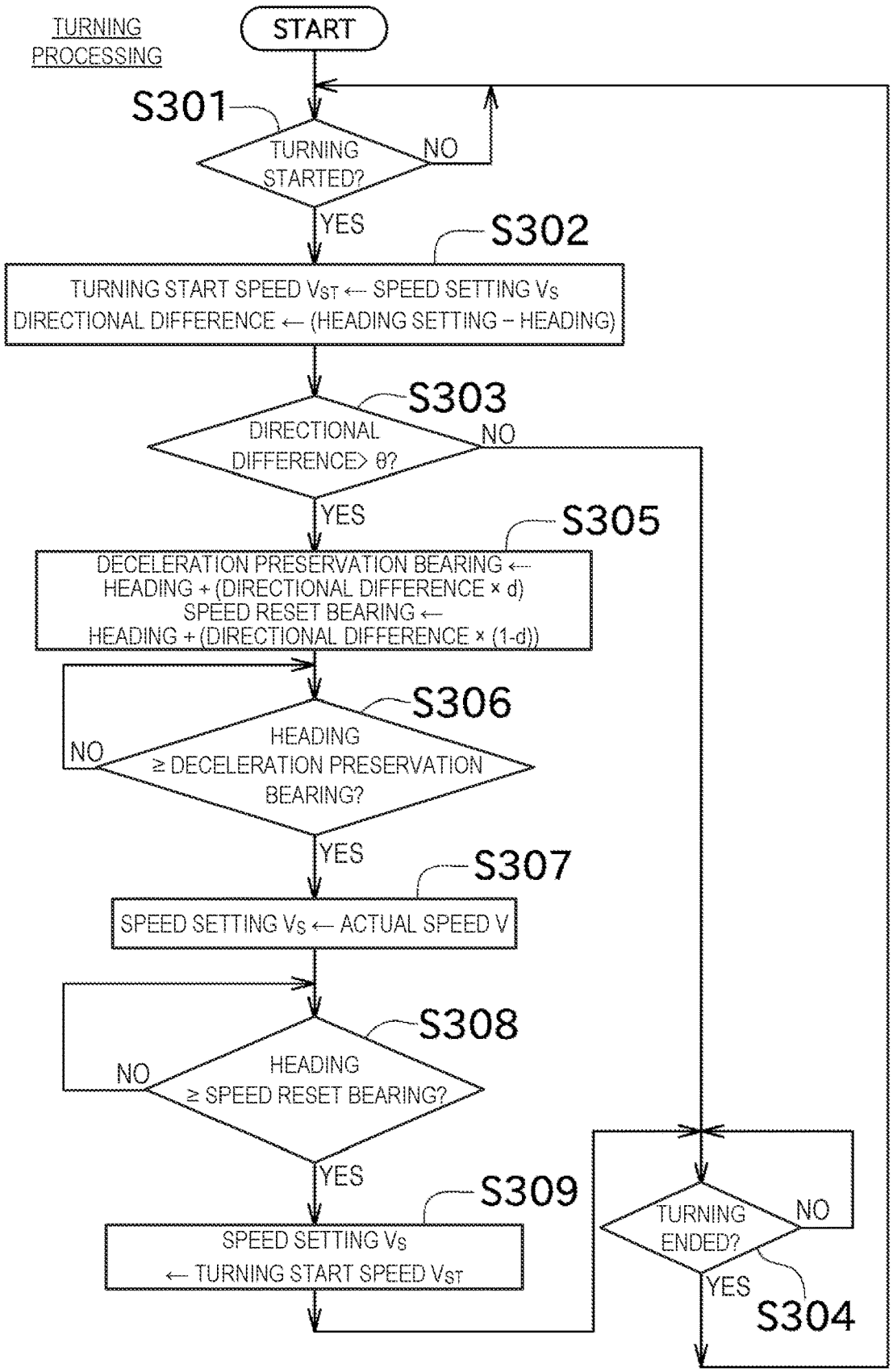
FIG. 10 is a flowchart related to a turning deceleration processing.

In detail, the turning speed controlling module 68 may perform a turning speed control processing illustrated in FIG. 10. The turning speed control processing may be performed independently from the speed rate processing of FIG. 3, and performed simultaneously parallel with the speed rate processing. Moreover, in the processing illustrated in FIG. 10, the determinations at Steps S301, S304, S306, and S308 may be performed at a period sufficiently shorter than the unit time $T_0$ described in the speed rate processing.

When the turning speed control processing illustrated in FIG. 10 is started, the turning speed controlling module 68 may determine whether the ship is turning by using the turning state determining part 69 (Step S301). If not turning, the turning speed controlling module 68 may return to Step S301.

As the result of the determination at Step S301, if the ship is turning, the turning speed controlling module 68 may store the current speed setting $V_S$ as a turning start speed $V_{ST}$, and calculate a directional difference between a heading setting set by the ship operator and the current heading (Step S302). The directional difference herein may be an absolute value, and therefore, it may be a positive value, regardless of the ship turning to the left or the right.

Then, the turning speed controlling module 68 may compare the calculated directional difference with a given angle θ (Step S303). The threshold angle θ may be set to a small angle to some extent. If the directional difference is at or below 0, this may mean that it is a mild turn and the deceleration of the ship during the turning may be small. Therefore, the turning speed controlling module 68 may skip processings at Steps S305-S309 (described later), and stand by until the turning state determining part 69 determines a termination of the turning (Step S304). If the turning speed controlling module 68 determines that the turning of the ship is finished at Step S304, it may return to Step S301.

Figure 11:
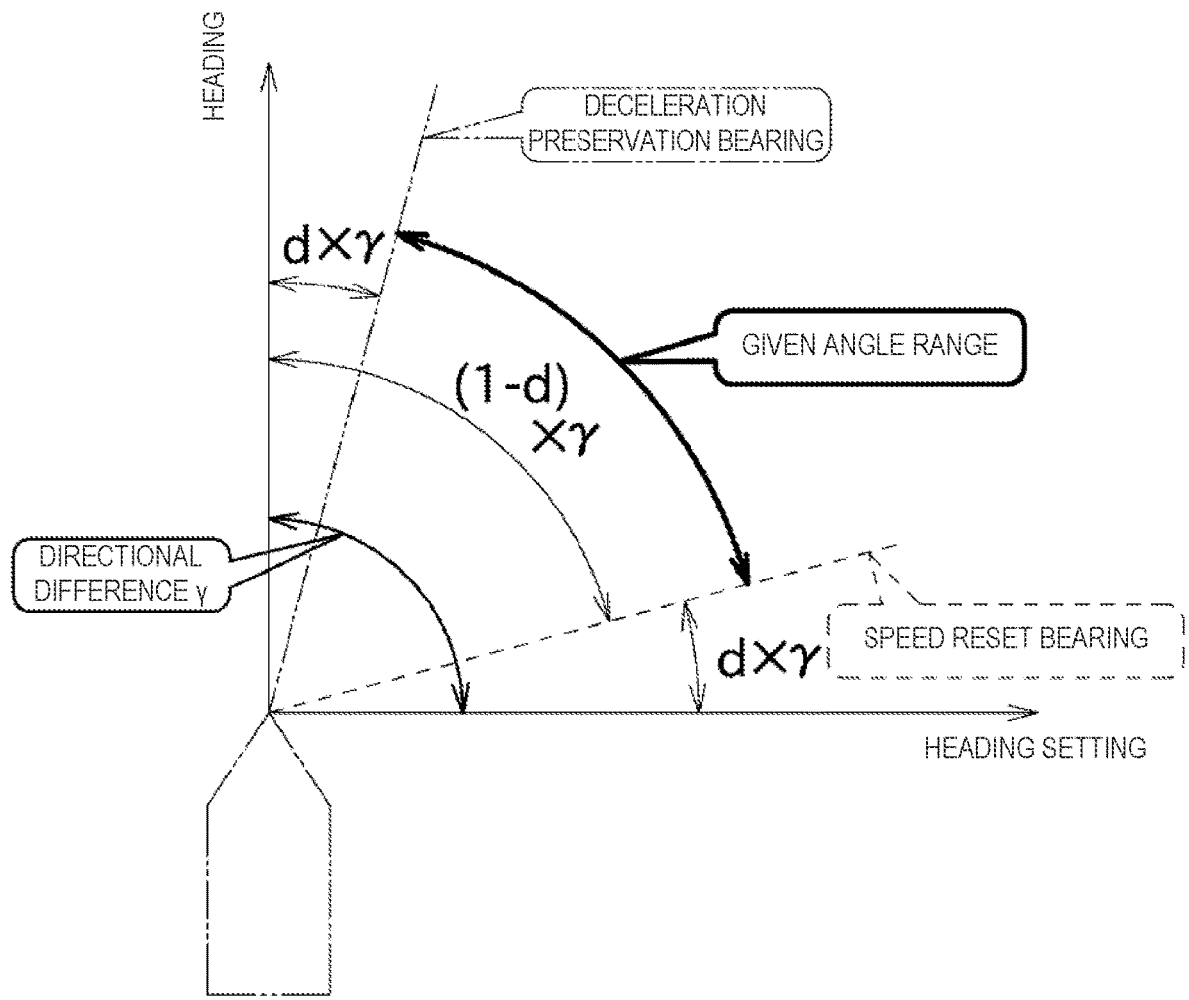
FIG. 11 is a conceptual view illustrating one example of a given turning range which is an applicable range of a turning speed setting during a turning.

As the result of the comparison at Step S303, if the calculated directional difference is above 0, the turning speed controlling module 68 may calculate a deceleration preservation bearing and a speed reset bearing (Step S305). As illustrated in FIG. 11, for example, the deceleration preservation bearing can be calculated by adding a value to the heading detected by the bearing sensor 2. The value may be obtained by multiplying a calculated directional difference γ by a given coefficient d (here, 0<d<1). The speed reset bearing can be calculated, for example, by multiplying the directional difference by a value obtained by subtracting the coefficient d from 1 and adding the acquired value to the heading.

Then, the turning speed controlling module 68 may compare the heading of the ship with the calculated deceleration preservation bearing (Step S306). If the heading is at or above the deceleration preservation bearing (i.e., if the turning angle after the ship starts the turning reaches an angle of the value obtained by multiplying the directional difference by the coefficient d), the turning speed controlling module 68 may output the actual speed V of the ship detected at this time, as the speed setting $V_S$ (Step S307). The speed setting $V_S$ at this time may correspond to the turning speed setting. Since it is after a part of the turning has been performed at this time, the actual speed V detected at Step S307 may be a speed reduced to some extent by water drag. The target speed setting module 63 may perform the speed rate processing using the speed setting $V_S$ outputted from the turning speed controlling module 68.

As the result of the comparison at Step S306, if the heading is below the deceleration preservation bearing, the turning speed controlling module 68 may wait for the heading to reach the deceleration preservation bearing.

After the processing at Step S307, the turning speed controlling module 68 may wait for the heading to reach the speed reset bearing (Step S308). In the meantime, the speed setting $V_S$ may become equal to the actual speed V during the speed rate processing performed by the target speed setting module 63. Therefore, the target speed $V_T$ may also become equal to the actual speed V, and the speed does not substantially change.

If the heading reaches the speed reset bearing (i.e., if the ship turned a given angle range illustrated in FIG. 11 from the deceleration preservation bearing), the turning speed controlling module 68 may output the turning start speed $V_{ST}$ stored at Step S302 as the speed setting $V_S$ (Step S309). Therefore, the speed rate processing performed by the target speed setting module 63 may again be performed based on the speed setting $V_S$ set by the ship operator. Then, the turning speed controlling module 68 may transit the processing to Step S304.

As described above, the turning speed controlling module 68 may substantially inhibit the acceleration/deceleration control in the given angle range which is a part of an intermediate turning range from the start to the end of the turning, by setting the actual speed V as the speed setting $V_S$. Therefore, an unnatural acceleration and an excessive deceleration during the turning may be both avoidable.

Meanwhile, by setting the coefficient d appropriately, the speed setting $V_S$, which is the target for following or tracking the target speed $V_T$, may return to the original value at a suitable timing before near the termination of turning. Therefore, a quick rising after the turning can be realized.

As described above, the automatic speed controlling device 6 of this embodiment may control the traveling speed of the ship so as to automatically track or follow the speed setting $V_S$ set by the ship operator. The automatic speed controlling device 6 may include the target speed setting module 63 and the change rate setting module 64. The target speed setting module 63 may change the target speed $V_T$ based on the given rate of change by setting the target speed $V_T$, which is a target to be followed by the traveling speed, for every unit time $T_0$ according to the speed setting $V_S$. The change rate setting module 64 may decrease the rate of change by adjusting the rate of change at the multiple stages, when the target speed $V_T$ set by the target speed setting module 63 approaches the speed setting $V_S$.

Therefore, the multiple-stage change of the speed with a plurality of rates of change can be achieved without requiring the given data, such as the speed-control map. Moreover, the occurrence of the overshoot can be reduced by decreasing the rate of change (the rate of change defined by the unit change amount $\Delta v_U$ and the unit time $T_0$) of the target speed $V_T$ which is the target for the speed of the movable body to follow, when the target speed $V_T$ approaches the speed setting $V_S$.

Although the suitable embodiment of the present disclosure is described above, the above configuration can be altered as follows, for example.

The speed rate processing may be terminated if the speed setting $V_{S(n)}$ is equal to the target speed $V_{T(n)}$ as the result of the determination at Step S101. In this case, the speed rate processing may be automatically started, for example, after the ship operator inputs the speed setting $V_S$ through the navigation device 4.

The unit time $T_0$ may be directly set, instead of the coefficient "a" related to the unit time $T_0$ of the target speed setting module 63.

The actual speed V acquired by the actual speed acquiring module 61 may be a speed through water, instead of the ground speed.

The change rate setting module 64 may also set three values of the unit change amount $\Delta v_U$ so that the target speed $V_T$ set by the target speed setting module 63 has three or more rates of change.

When calculating a smaller one of two unit change amounts $\Delta v_U$, the change rate setting module 64 may calculate it by multiplying the reference unit change amount $\Delta v_S$ by a given ratio (e.g., H %), instead of dividing the reference unit change amount $\Delta v_S$ by two. This ratio (H %) may be set in advance or may be adjusted according to the preferences of the ship operator.

The change rate setting module 64 may adjust the rate of change in the target speed $V_T$ set by the target speed setting module 63 by adjusting the unit time $T_0$ and outputting it to the target speed setting module 63, instead of the reference unit change amount $\Delta v_S$ set by the ship operator. In this case, the target speed setting module 63 may set the target speed $V_T$ for every unit time $T_0$ outputted by the change rate setting module 64, for example, based on the reference unit change amount $\Delta v_S$ set by the ship operator.

Instead of determining the deceleration preservation bearing and the speed reset bearing based on the single coefficient d, they may be determined based on different coefficients.

The turning speed control processing by the turning speed controlling module 68 may be performed, for example, only when the ship turns while accelerating.

TERMINOLOGY

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms) Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A speed control device configured to control a speed of a marine vessel so that the speed automatically follows a speed setting set by a user, comprising:
   processing circuitry configured
      to set a target speed that is a target of the speed of the marine vessel to follow, for every unit time, according to the speed setting, to change the target speed based on a given rate of change;
      to decrease the rate of change by adjusting the rate of change at multiple stages, when the target speed approaches the speed setting;

to calculate a base throttle opening related to a throttle opening control of an engine provided to the marine vessel, based on the target speed; and to output the base throttle opening to a control device of the engine as a throttle opening for control, such that the processing circuitry outputs a given lower limit of the throttle opening to the control device of the engine as the throttle opening for control when the base throttle opening is below the given lower limit of the throttle opening, with the given lower limit being based on a dead zone during which the speed of the marine vessel remains unchanged in response to a change in the throttle opening received by the control device of the engine.

2. The speed control device of claim 1, wherein the rate of change in the target speed is acquired based on a given speed change parameter, the speed change parameter including the unit time and a reference amount of change in the target speed for every unit time.

3. The speed control device of claim 2, wherein the processing circuitry adjusts the rate of change to two different values based on the setting of the reference amount of change.

4. The speed control device of claim 1, wherein the processing circuitry is further configured
to set a first rate of change, a second rate of change smaller than the first rate of change, and a change speed at which the first rate of change is switched to the second rate of change, based on a given speed change parameter, and
while the speed setting is above the speed of the marine vessel
to output the first rate of change when the target speed is below the change speed, and
to output the second rate of change when the target speed is above the change speed, and
while the speed setting is below the speed of the marine vessel,
to output the first rate of change when the target speed is above the change speed, and
to output the second rate of change when the target speed is below the change speed.

5. The speed control device of claim 1, wherein the processing circuitry is further configured
to acquire an actual speed that is a current speed of the marine vessel;
to store the speed setting as a turning start speed; and
to output a turning speed setting that is the speed setting during a turning of the marine vessel,
wherein, while the marine vessel is turning, the processing circuitry sets the actual speed as the speed setting, when a turning angle of the marine vessel from a start of the turning is within a given angle range.

6. The speed control device of claim 1, wherein the processing circuitry is further configured
to acquire an actual speed that is a current speed of the marine vessel; and
to control the speed of the marine vessel based on the target speed and the actual speed so that the speed follows the target speed.

7. An automatic navigation system, comprising:
the speed control device of claim 1; and
a navigation device configured to display information related to navigation.

8. A method of controlling a speed, comprising:
setting a target speed that is a target of a speed of a marine vessel to follow for every unit time, according to a speed setting set by a user in order to make the speed of the marine vessel follow the target speed by the control to change the target speed based on a given rate of change;
adjusting the rate of change at multiple stages when the set target speed approaches the speed setting to decrease the rate of change;
calculating a base throttle opening related to a throttle opening control of an engine provided to the marine vessel, based on the target speed; and
outputting the base throttle opening to a control device of the engine as a throttle opening for control, such that a given lower limit of the throttle opening is output to the control device of the engine as the throttle opening for control when the base throttle opening is below the given lower limit of the throttle opening, with the given lower limit being based on a dead zone during which the speed of the marine vessel remains unchanged in response to a change in the throttle opening received by the control device of the engine.

9. The speed control device of claim 2, wherein the processing circuitry is further configured
to set a first rate of change, a second rate of change smaller than the first rate of change, and a change speed at which the first rate of change is switched to the second rate of change, based on a given speed change parameter, and
while the speed setting is above the speed of the marine vessel
to output the first rate of change when the target speed is below the change speed, and
to output the second rate of change when the target speed is above the change speed, and
while the speed setting is below the speed of the marine vessel,
to output the first rate of change when the target speed is above the change speed, and
to output the second rate of change when the target speed is below the change speed.

10. The speed control device of claim 3, wherein the processing circuitry is further configured
to set a first rate of change, a second rate of change smaller than the first rate of change, and a change speed at which the first rate of change is switched to the second rate of change, based on a given speed change parameter, and
while the speed setting is above the speed of the marine vessel
to output the first rate of change when the target speed is below the change speed, and
to output the second rate of change when the target speed is above the change speed, and
while the speed setting is below the speed of the marine vessel,
to output the first rate of change when the target speed is above the change speed, and
to output the second rate of change when the target speed is below the change speed.

11. The speed control device of claim 2, wherein the processing circuitry is further configured
to acquire an actual speed that is a current speed of the marine vessel;
to store the speed setting as a turning start speed; and
to output a turning speed setting that is the speed setting during a turning of the marine vessel,
wherein, while the marine vessel is turning, the processing circuitry sets the actual speed as the speed setting, when a turning angle of the marine vessel from a start of the turning is within a given angle range.

12. A non-transitory computer-readable recording medium storing a program causing a processor of a hull control device to execute processing, the processor configured to control operation of the device, the processing comprising:
- setting a target speed that is a target of a speed of a marine vessel to follow for every unit time, according to a speed setting set by a user in order to make the speed of the marine vessel follow the target speed by the control to change the target speed based on a given rate of change;
- adjusting the rate of change at multiple stages when the set target speed approaches the speed setting to decrease the rate of change;
- calculating a base throttle opening related to a throttle opening control of an engine provided to the marine vessel, based on the target speed; and
- outputting the base throttle opening to a control device of the engine as a throttle opening for control, such that a given lower limit of the throttle opening is output to the control device of the engine as the throttle opening for control when the base throttle opening is below the given lower limit of the throttle opening, with the given lower limit being based on a dead zone during which the speed of the marine vessel remains unchanged in response to a change in the throttle opening received by the control device of the engine.

* * * * *